US012691835B2

(12) United States Patent
Babian et al.

(10) Patent No.: US 12,691,835 B2
(45) Date of Patent: Jul. 28, 2026

(54) WIRE HARNESS ASSEMBLIES

(71) Applicant: Toyota Motor Engineering & Manufacturing North America, Inc., Plano, TX (US)

(72) Inventors: Lindsay A. Babian, Canton, MI (US); Alexander W. Schuyler, Ann Arbor, MI (US); Vasudeva S. Murthy, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 146 days.

(21) Appl. No.: 18/427,134

(22) Filed: Jan. 30, 2024

(65) Prior Publication Data

US 2025/0242766 A1 Jul. 31, 2025

(51) Int. Cl.
H02G 11/02 (2006.01)
B60R 16/02 (2006.01)

(52) U.S. Cl.
CPC ......... B60R 16/0207 (2013.01); H02G 11/02 (2013.01)

(58) Field of Classification Search
None
See application file for complete search history.

(56) References Cited

U.S. PATENT DOCUMENTS 5,679,925 A    10/1997 Dilley
6,321,489 B1 * 11/2001 Murofushi ............ E05F 15/646
                                                49/360
6,575,760 B2 *  6/2003 Doshita ................. B60R 16/027
                                                174/72 A
6,818,827 B2 * 11/2004 Kato ...................... H02G 11/00
                                                191/23 R
7,202,415 B2 *  4/2007 Fujita .................. B60R 16/0207
                                                174/72 A (Continued)

FOREIGN PATENT DOCUMENTS

CN          205855634 U      1/2017
CN          213401763 U      6/2021

(Continued)

OTHER PUBLICATIONS

TBL 15—Medium Duty Spring Retractable Tool Balancer (https://www.reelcraft.com/product/interactive-catalog/tool-balancers/tbl-15-heavy-duty-spring-retractable-tool-balancer/).

(Continued)

*Primary Examiner* — Krystal Robinson
(74) *Attorney, Agent, or Firm* — Dinsmore & Shohl LLP

(57) ABSTRACT

A wire harness assembly of a vehicle seat secured to a vehicle floor includes a wire harness housing fixed to a stationary portion of the vehicle seat and a cable including a proximal end portion, an intermediate portion, and a distal end portion. The intermediate portion of the cable is received within the wire harness housing. The wire harness assembly also includes a rigid case surrounding the distal end portion of the cable. The cable movable between a retracted position and an extended position; in the retracted position the rigid case is at least partially received within the wire harness housing and in the extended position the rigid case extends farther out of the wire harness housing than in the retracted position.

10 Claims, 3 Drawing Sheets

(56)                    References Cited

U.S. PATENT DOCUMENTS

| | | | | |
|---|---|---|---|---|
| 7,265,294 | B2 * | 9/2007 | Tsunoda ................ | H02G 11/00 |
| | | | | 174/72 A |
| 8,720,657 | B2 | 5/2014 | Kramer et al. | |
| 11,777,296 | B2 * | 10/2023 | Kato ...................... | H02G 11/00 |
| | | | | 174/72 A |
| 2002/0005014 | A1 * | 1/2002 | Doshita ............... | H02G 11/006 |
| | | | | 49/502 |
| 2004/0017648 | A1 * | 1/2004 | Tsubaki ............. | B60R 16/0215 |
| | | | | 361/601 |
| 2008/0142260 | A1 * | 6/2008 | Yamaguchi .......... | B60N 2/0224 |
| | | | | 174/72 A |
| 2010/0126783 | A1 | 5/2010 | Chen | |
| 2014/0027556 | A1 * | 1/2014 | Christensen ........... | H02G 11/02 |
| | | | | 242/378 |
| 2016/0176369 | A1 * | 6/2016 | Ito .......................... | H01B 9/006 |
| | | | | 174/72 A |
| 2017/0174154 | A1 * | 6/2017 | Kamenoue ............... | H02G 3/38 |
| 2018/0361957 | A1 * | 12/2018 | Kato ................... | B60R 16/0215 |

FOREIGN PATENT DOCUMENTS

| | | | |
|---|---|---|---|
| JP | 11105641 A | * | 4/1999 |
| KR | 10-1106855 | | 1/2012 |
| WO | 2017/182583 A1 | | 10/2017 |
| WO | 2018/055344 A1 | | 3/2018 |
| WO | 2019/162691 A1 | | 8/2019 |

OTHER PUBLICATIONS

IRecoil—IPhone Retractable Headphones (https://www.instructables.com/iRecoil-iPhone-Retractable-Headphones/).

* cited by examiner

WIRE HARNESS ASSEMBLIES

FIELD

The embodiments described herein generally relate to wire harness assemblies, in particular, wire harness assemblies with a rigid case surrounding a portion of a cable of the wire harness assemblies.

BACKGROUND

As background, wire harnesses organizes a cable or arrangement of cables into or around a casing. The casing may hold multiple cables in place and, thus, organize the cables. The casing may have inlets and outlets on either side such that a cable may be inserted in one end of the casing and extracted from another end of the casing. The cable may be partially or entirely inserted into the casing; the cable may also wrap around a center of the casing. Thus, the casing may protect the cable from being kinked, bent, or otherwise distorted by surrounding objects.

However, when a cable is extended from the casing, the cable is subject to being distorted by the surrounding objects. This is particularly a problem when the cable and casing are integrated into moving parts of an assembly, as the cable may be caught on or snagged by surrounding objects when being extended from or retracted into the casing. Current wire harness casings only protect the cable while it is housed within the casing, not when the cable is extracted from the casing and, thus, exposed to surrounding objects.

Accordingly, a need exists for wire harness assemblies capable of protecting a portion of the cable in a rigid case when the cable is extracted from the wire harness housing.

SUMMARY

In accordance with one embodiment, a wire harness assembly of a vehicle seat is provided. The wire harness assembly of a vehicle seat secured to a vehicle floor includes a wire harness housing fixed to a stationary portion of the vehicle seat and a cable comprising a proximal end portion, an intermediate portion, and a distal end portion. The intermediate portion of the cable is received within the wire harness housing. The wire harness assembly also includes a rigid case surrounding the distal end portion of the cable. The cable is movable between a retracted position and an extended position; in the retracted position the rigid case is at least partially received within the wire harness housing and in the extended position the rigid case extends farther out of the wire harness housing than in the retracted position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Embodiments described herein generally related to a wire harness assembly of a seat with a wire harness housing and a rigid case surrounding a distal end portion of a cable to prevent surrounding objects from interfering with the cable when it is extended from or retracted into the wire harness housing. One non-limiting example of a wire harness assembly of a seat includes a wire housing and a rigid case surrounding a distal end portion of the cable that is at least partially received within the wire harness housing in a retracted position. The rigid case extends farther out of the wire harness housing in an extended position when compared to the position of the rigid case with respect to the wire harness housing in the retracted position.

Figure 1:
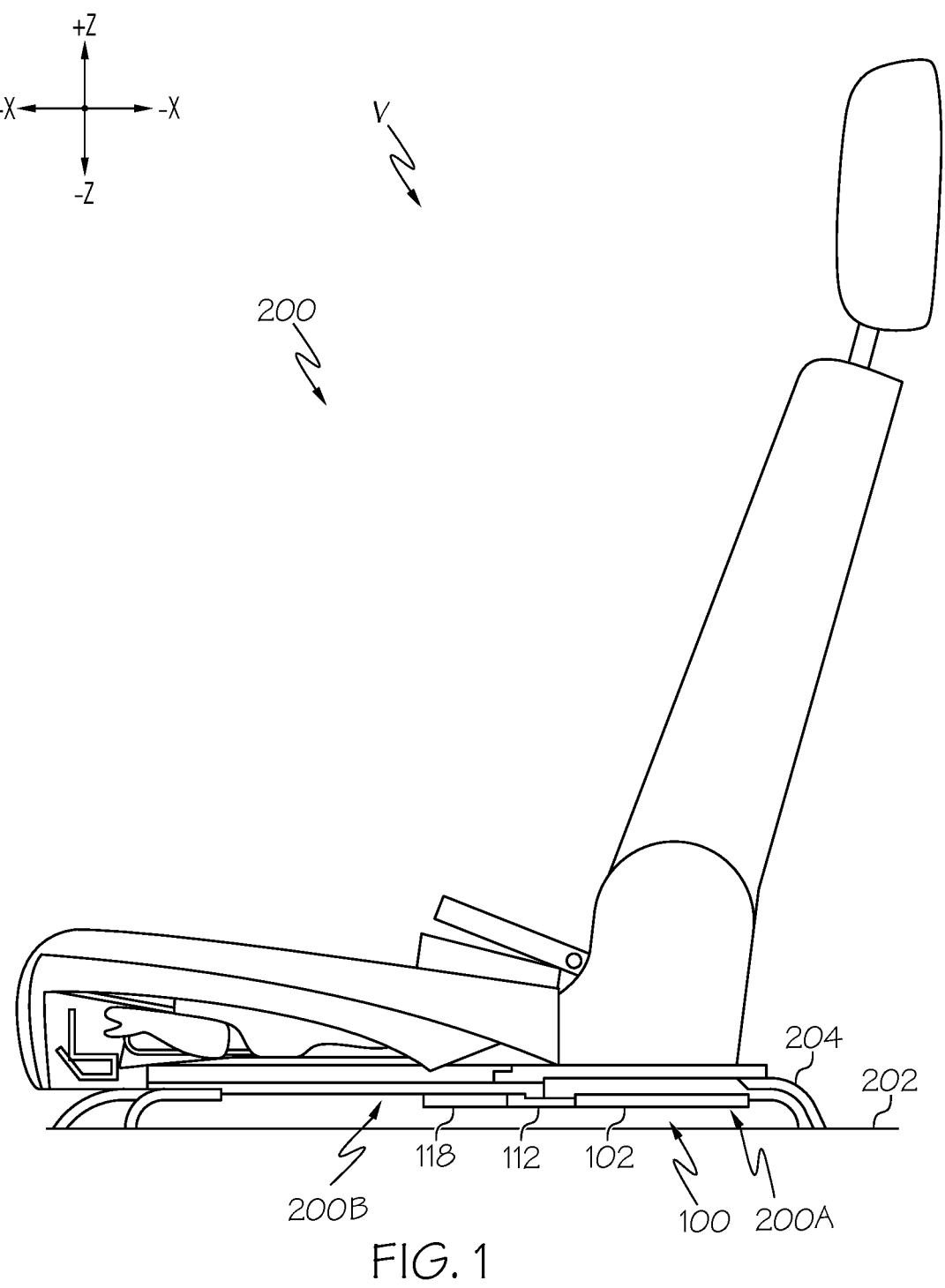
FIG. 1 depicts a side-view of a wire harness assembly of a vehicle seat, according to one or more embodiments illustrated and described herein.
Figure 2:
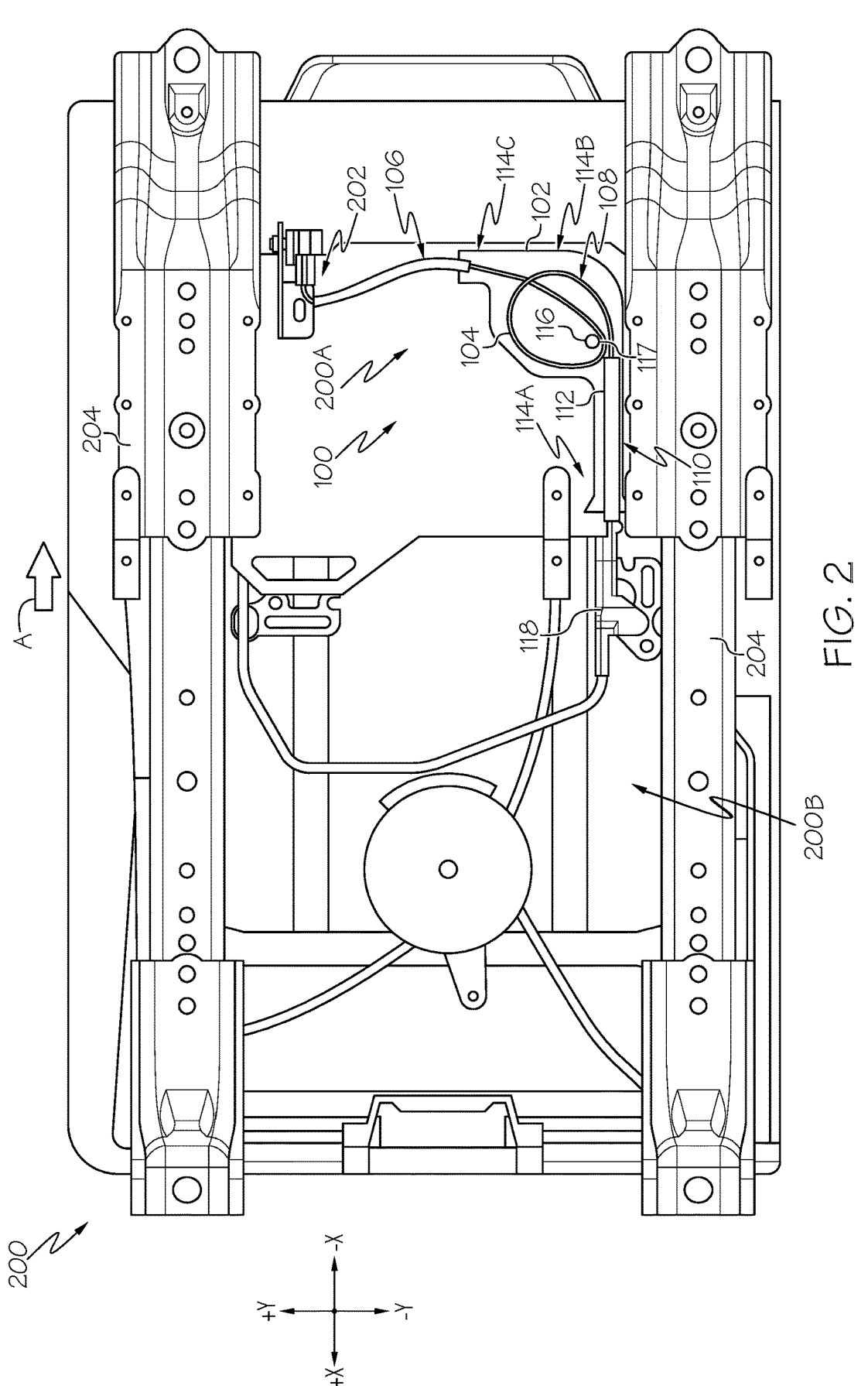
FIG. 2 depicts a bottom view the wire harness assembly of the vehicle seat in a retracted position, according to one or more embodiments illustrated and described herein.
Figure 3:
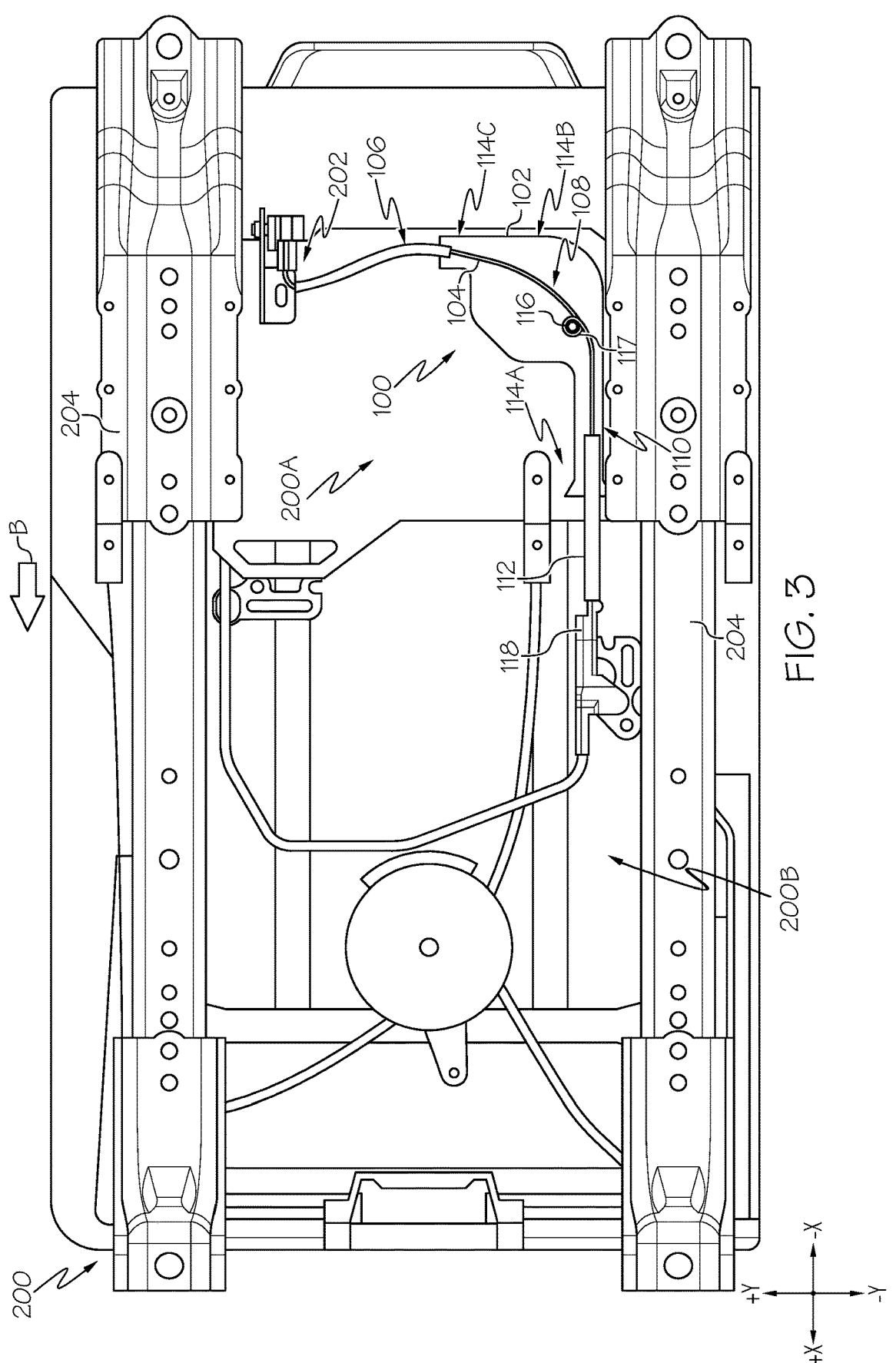
FIG. 3 depicts a bottom view the wire harness assembly of the vehicle seat in an extended position, according to one or more embodiments illustrated and described herein.

As used herein, the term "vehicle front-side" and "vehicle rear-side" refer to the forward and rearward sides of the vehicle (i.e., in the +/−X direction of the coordinate system depicted in FIGS. 1-3).

As used herein, the terms "distal" and "proximal" are used to describe the relative positioning of various components of the system.

Referring to FIG. 1, a wire harness assembly 100 of a seat 200 is provided. Although the seat 200 is provided in a vehicle V in the illustrated embodiment, it is appreciated that the seat 200 is not limited to being provided in the vehicle V. The seat 200 (hereinafter referred to as "vehicle seat 200") is secured to a vehicle floor 202 of the vehicle V. The wire harness assembly 100 includes a wire harness housing 102 fixed to a stationary portion 200A of the vehicle seat 200 and a cable 104. The cable 104 includes a proximal end portion 106, an intermediate portion 108, and a distal end portion 110. A rigid case 112 surrounds the distal end portion 110 of the cable 104. In some embodiments, the cable 104 is an electrical cable or a bundle of a plurality of electrical cables configured to transmit electrical signals or transfer electrical power between a first electrical component and a second electrical component.

The cable 104 is movable between a retracted position and an extended position, as depicted in FIG. 2 and FIG. 3, respectively. In the retracted position, the rigid case 112 is at least partially received within the wire harness housing 102. In the extended position, the rigid case 112 extends farther out of the wire harness housing 102 than in the retracted position.

FIG. 2 depicts the vehicle seat 200 in a first position. It should be understood that the vehicle seat 200 may include the stationary portion 200A of the vehicle seat and a movable portion 200B of the vehicle seat 200, such that the movable portion 200B may move relative to the stationary portion 200A of the vehicle seat 200. In some embodiments, the stationary portion 200A is fixed relative to a vehicle floor 202 and the movable portion 200B is movable relative to the vehicle floor 202.

The first position of the vehicle seat 200 generally corresponds to the retracted position of the cable 104. FIG. 3 depicts the vehicle seat 200 in a second position. The second position of the vehicle seat 200 generally corresponds to the extended position of the cable 104. Thus, when the vehicle seat 200 is in the first position, the rigid case 112 is at least partially received within the wire harness housing 102. When the vehicle seat 200 is in the second position, the cable 104 is in the extended position, and the rigid case 112 extends farther out of the wire harness housing 102 than compared to positioning of the rigid case 112 in the first, retracted position. In embodiments, the vehicle seat 200 may be closer to a vehicle rear-side when the vehicle seat 200 is in the first position and closer to a vehicle front-side when the vehicle seat 200 is in the second position. As such, arrow A in FIG. 2 depicts that the vehicle seat 200 has been slid back closer to the vehicle rear-side, while arrow B in FIG. 3 depicts that the vehicle seat 200 has been slid forward closer to the vehicle front-side. Accordingly, arrow A depicts that the vehicle seat 200 has been moved from the second position to the first position, while arrow B depicts that the vehicle seat 200 has been moved from the first position to the second position.

As depicted in FIG. 1, the wire harness assembly 100 is generally positioned below the vehicle seat 200. The wire harness assembly 100 may be positioned below a front seat, rear seat, third-row, or any other seat of a vehicle. The vehicle may be any car, truck, bus, or any other motor vehicle where an adjustable seat may be desired. A movable portion 200B of the vehicle seat 200 may be slidably coupled to seat rails 204 that are coupled to the vehicle floor 202, as further depicted in FIG. 2. In other embodiments, the vehicle seat 200 may include seat tracks that slidably couple to corresponding vehicle floor tracks, such that the vehicle seat 200 slides directly on the vehicle floor 202 rather than on the seat rails 204 that are attached to the vehicle floor 202.

The wire harness housing 102 may be fixed to the stationary portion 200A of the vehicle seat 200. The proximal end portion 106 of the cable 104 may be secured to the stationary portion 200A of the vehicle seat 200 and the distal end portion 110 of the cable 104 may be secured to the movable portion 200B of the vehicle seat 200, such that when the vehicle seat 200 slides (either toward the vehicle rear-side or the vehicle front-side, as denoted by arrow A and arrow B, respectively), the wire harness housing 102 remains stationary on the stationary portion 200A of the vehicle seat 200 while the cable 104 moves with the movable portion 200B of the vehicle seat 200, relative to the wire harness housing 102. It should be understood that the same movements of the cable 104 may be achieved when the wire harness housing 102 is fixed to the movable portion 200B of the vehicle seat 200 and the distal end portion 110 of the cable 104 is secured to the stationary portion 200A of the vehicle seat 200, so long as the a portion of the cable 104 is moving relative to the wire harness housing 102. In other embodiments, either the wire harness housing 102 or the distal end portion 110 of the cable may be secured to the vehicle floor 202.

A length of the cable 104 may be 6 inches, 1 foot, 2 feet, 3 feet, 5 feet, or any other suitable length. In embodiments, a diameter of the cable 104 may be a sixteenth inch, eighth inch, quarter inch, or any other suitable diameter. The cable 104 may be made up of metals, nylon, or any other suitable material.

Referring now to FIG. 2, the wire harness housing 102 may include a first opening 114A, a body 114B, and a second opening 114C. The intermediate portion 108 of the cable 104 may be housed within the body 114B of the wire harness housing 102. The body 114B is depicted in FIG. 2 as circular, but the body 114B may be square, hexagonal, or any other suitable shape. The proximal end portion 106 and/or the distal end portion 110 of the cable 104 may be received by or extended from first opening 114A and/or the second opening 114C. As such, the first opening 114A and the second opening 114C may be of the same or slightly larger diameter than the cable 104.

As depicted in FIG. 2, the distal end portion 110 of the cable 104 may be received by or extended from the first opening 114A. The distal end portion 110 may also be secured to the movable portion 200B of the vehicle seat 200. As such, the distal end portion 110 may move with the movable portion 200B of the vehicle seat 200. On the other hand, the proximal end portion 106 of the cable 104 is depicted in FIG. 2 as being secured to the stationary portion 200A of the vehicle seat 200; as such, the proximal end portion 106 of the cable 104 may not extend from or be received by the second opening 114C since it is stationary relative to the wire harness housing 102. The first opening 114A and the second opening 114C may have a funnel shape, which may assist in guiding the cable 104 into and out of the wire harness housing 102. The first opening 114A and the second opening 114C may extend 1 inch, 2 inches, 3 inches, 6 inches, 12 inches, or any other suitable distance from the body 114B of the wire harness housing 102.

Although the wire harness housing 102 is depicted as including two openings, it should be understood that it is contemplated that the wire harness housing 102 may include only one opening. The wire harness housing 102 may be made of metals, polyethylene, or any other suitable material. The wire harness housing 102 may be secured to the stationary portion 200A of the vehicle seat 200 with screws, bolts, fasteners, clamps, adhesive, or any other suitable mechanism of securement.

The wire harness housing 102 may further include a post 116. The post 116 is generally included within the body 114B of the wire harness housing 102. The post 116 may be in the center of the body 114B, at/near one of the first opening 114A, as depicted in FIG. 2, or at/near the second opening 114C. The intermediate portion 108 of the cable 104 may be secured to the post 116. The intermediate portion 108 of the cable 104 may be tighter or looser around the post 116 based on whether the vehicle seat 200 is in the first position or the second position. A diameter of the cable 104 looped around the post 116 may be greater in the first position (as depicted in FIG. 2) and, thus, the intermediate portion 108 of the cable may be looser around the post 116 when compared to the diameter of the cable 104 looped around the post 116 in the second position (as depicted in FIG. 3). As the diameter of the cable 104 looped around the post 116 decreases, the intermediate portion 108 becomes more tightly secured to the post 116.

The intermediate portion 108 of the cable 104 may be secured to the post 116. Moreover, the post 116 may be rotatable. The post 116 may be made of the same or different material as compared to the wire harness housing 102. The post 116 may include a post spring 117, such that the post 116 rotates to tightly wrap the intermediate portion 108 of the cable 104 around the post 116. The post spring 117 may automatically retract the cable 104 into the wire harness housing 102 when the cable 104 is translated from the extended position to the retracted position. Moreover, the post spring 117 may wrap the cable 104 tight around the post 116, even when the cable 104 is in the retracted position (i.e., when the vehicle seat 200 is in the first position). This may prevent the intermediate portion 108 of the cable 104 from overlapping or getting tangled with itself within the body 114B of the wire harness housing 102.

As noted hereinabove, the cable 104 may have the proximal end portion 106, the intermediate portion 108, and the distal end portion 110. Moreover, each of the proximal end portion 106, the intermediate portion 108, and the distal end portion 110 may each include a proximal end and a distal end. Accordingly, the distal end of the proximal end portion 106 of the cable 104 may be connected to the proximal end of the intermediate portion 108 of the cable, while the distal end of the intermediate portion 108 of the cable 104 may be connected to the proximal end of the distal end portion 110 of the cable 104. The portions of the cable 104 are labeled for illustrative purposes only and it should be understood that any of the cable 104 may be considered any of the proximal end portion 106, the intermediate portion 108, and/or the distal end portion 110.

Referring again to FIG. 2 and FIG. 3, the rigid case 112 surrounds at least a portion of the distal end portion 110 of the cable 104. When the cable 104 is in the retracted position, the rigid case 112 is at least partially received within the wire harness housing 102. As depicted in FIG. 2, nearly the entirety of the rigid case 112 is received within the first opening 114A and the body 114B of the wire harness housing 102. In other embodiments, only a portion of the rigid case 112 is received within the first opening 114A of the wire harness housing 102 when the cable 104 is in the retracted position.

Referring now to FIG. 3, the cable 104 is depicted as in the extended position. When the cable 104 is in the extended position, the rigid case 112 may extend farther out of the wire harness housing 102 when compared to the retracted position depicted in FIG. 2. FIG. 3 depicts that the rigid case 112 is nearly halfway out of the first opening 114A of the wire harness housing 102. In some embodiments, the rigid case 112 and the distal end portion 110 of the cable 104 may be fully extended from the wire harness housing 102 when the vehicle seat 200 moves from the first position to the second position. However, it should be understood that the rigid case 112 may be nearly entirely within the first opening 114A, nearly halfway out of the first opening 114A, or in any other suitable position with respect to the first opening 114A, so long as the rigid case 112 extends further out of the wire harness housing 102 in the extended position when compared to the retracted position.

As the rigid case 112 surrounds at least part of the distal end portion 110 of the cable 104, the rigid case 112 provides protection to the distal end portion 110 of the cable 104 that extends out of the wire harness housing 102. As such, the rigid case 112 may prevent the cable 104 from getting caught/snagged on surrounding components of the vehicle seat 200 or the vehicle floor 202. The rigid case 112 may be coupled to the distal end portion 110 of the cable 104 through adhesives, fasteners, brackets, an interference fit, or any other suitable means of coupling.

The rigid case 112 may be completely rigid such that the rigid case 112 is inflexible. In other embodiments, the rigid case 112 may be bendable/flex when a force acts upon the rigid case 112; in such embodiments, the rigid case 112 may reform to an originally straightened shape when the force no longer acts upon the rigid case 112. As such, the rigid case 112 may wrap around the post 116 if the rigid case 112 is retracted into the wire harness housing 102 far enough so as to come into contact with the post 116. The rigid case 112 may be made of polyethylene, metals, a combination thereof, or any other suitable material. The rigid case 112 may be of the same or slightly larger diameter than the cable 104, and the same or slightly less diameter than the first opening 114A and the second opening 114C of the wire harness housing 102.

The distal end portion 110 of the cable 104 may be secured to the vehicle seat 200. through a clamp 118. The clamp 118 may be coupled to the distal end portion 110 of the cable 104 and the clamp 118 may be secured to the movable portion 200B of the vehicle seat 200. As such, when the vehicle seat 200 moves from the first position to the second position, the clamp 118 moves with the vehicle seat 200 and, thus, moves the cable 104 form the retracted position to the extended position, depicted in FIG. 2 and FIG. 3, respectively. The clamp 118 may be secured to the vehicle seat 200 through the use of screws, bolts, adhesives, or any other suitable means of securement.

While the wire harness assembly 100 has been depicted and described as being integrated into the bottom-side of the vehicle seat 200, it should be understood that the wire harness assembly 100 may be integrated into any parts and/or assemblies where movement extension/retraction of a cable 104 is desired.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A wire harness assembly of a vehicle seat secured to a vehicle floor, comprising:
   a wire harness housing fixed to a stationary portion of the vehicle seat;
   a cable comprising a proximal end portion, an intermediate portion, and a distal end portion, the intermediate portion of the cable is received within the wire harness housing; and
   a rigid case surrounding the distal end portion of the cable, the cable movable between a retracted position and an extended position, in the retracted position the rigid case is at least partially received within the wire harness housing and in the extended position the rigid case extends farther out of the wire harness housing than in the retracted position.

2. The wire harness assembly of the vehicle seat of claim 1, wherein the wire harness housing includes a post and the intermediate portion of the cable wraps around the post.

3. The wire harness assembly of the vehicle seat of claim 2, wherein the post is rotatable.

4. The wire harness assembly of the vehicle seat of claim 2, wherein the intermediate portion of the cable is secured to the post.

5. The wire harness assembly of the vehicle seat of claim 1, wherein the proximal end portion of the cable is secured to the stationary portion of the vehicle seat.

6. The wire harness assembly of the vehicle seat of claim 1, wherein the distal end portion of the cable is secured to a movable portion of the vehicle seat.

7. The wire harness assembly of the vehicle seat of claim 6, wherein the distal end portion of the cable is secured to the movable portion of the vehicle seat through a clamp.

8. The wire harness assembly of the vehicle seat of claim 1, wherein the vehicle seat is slidably coupled to seat rails.

9. The wire harness assembly of the vehicle seat of claim 8, wherein the rigid case and the distal end portion of the cable are fully extended from the wire harness housing when the vehicle seat moves from a first position to a second position.

10. The wire harness assembly of the vehicle seat of claim 9, wherein the vehicle seat is closer to a vehicle rear-side in the first position and the vehicle seat is closer to a vehicle front-side in the second position.

* * * * *